United States Patent
Nelson

(10) Patent No.: US 6,920,025 B2
(45) Date of Patent: Jul. 19, 2005

(54) GFCI WITH REVERSE LINE/LOAD WIRING PREVENTION

(75) Inventor: Bonilla Nelson, West Haven, CT (US)

(73) Assignee: Hubbell Incorporated, Orange, CT (US)

( * ) Notice: Subject to any disclaimer, the term of this patent is extended or adjusted under 35 U.S.C. 154(b) by 104 days.

(21) Appl. No.: 10/173,791

(22) Filed: Jun. 19, 2002

(65) Prior Publication Data

US 2003/0086220 A1 May 8, 2003

Related U.S. Application Data

(60) Provisional application No. 60/311,346, filed on Aug. 13, 2001.

(51) Int. Cl.[7] ............................................... H02H 3/15
(52) U.S. Cl. ........................................................ 361/42
(58) Field of Search ............................ 361/42, 45, 111, 361/115

(56) References Cited

U.S. PATENT DOCUMENTS

| | | | |
|---|---|---|---|
| 4,024,436 A | * | 5/1977 | Adams ........................ 361/45 |
| 4,442,470 A | * | 4/1984 | Misencik ..................... 361/46 |
| 4,816,957 A | | 3/1989 | Irwin |
| 4,833,564 A | | 5/1989 | Pardue et al. |
| 4,933,801 A | * | 6/1990 | Glennon et al. ............... 361/45 |
| 5,477,412 A | | 12/1995 | Neiger et al. |
| 5,706,155 A | | 1/1998 | Neiger et al. |
| 5,729,417 A | | 3/1998 | Neiger et al. |
| 5,963,408 A | | 10/1999 | Neiger et al. |
| 6,040,967 A | | 3/2000 | DiSalvo |
| 6,052,265 A | | 4/2000 | Zaretsky et al. |
| 6,226,161 B1 | | 5/2001 | Neiger et al. |
| 6,246,558 B1 | | 6/2001 | DiSalvo et al. |
| 6,262,871 B1 | | 7/2001 | Nemir et al. |
| 6,522,510 B1 | * | 2/2003 | Finlay et al. ................. 361/42 |
| 6,621,388 B1 | * | 9/2003 | Macbeth ...................... 335/18 |
| 6,724,590 B1 | * | 4/2004 | Radosavljevic et al. ...... 361/42 |

* cited by examiner

Primary Examiner—Brian Sircus
Assistant Examiner—Boris Benenson
(74) Attorney, Agent, or Firm—Alfred N. Goodman; Stacey J. Longanecker; Peter L. Kendall

(57) ABSTRACT

A system and method employing a fault circuit interrupter to provide enhanced miswiring protection. The fault circuit interrupter is used with an alternating current (AC) receptacle and comprises first and second source terminals, and first and second load terminals. The fault circuit interrupter also comprises a sensing circuit, which is adapted to selectively enter a fault detection state in response to an imbalance of current flow in the AC receptacle. A latching mechanism is also provided and is adapted to break at least one conductive path between the source and load terminals of the AC receptacle in response to entry of the sensing circuit in the fault state. The sensing circuit is further adapted to maintain the latching mechanism in a condition to maintain a break in at least one of the conductive paths when an AC source is connected to the load terminals instead of to the source terminals.

18 Claims, 3 Drawing Sheets

GFCI WITH REVERSE LINE/LOAD WIRING PREVENTION

This application claims benefit under 35 U.S.C. § 119(e) from U.S. Provisional Patent Application Ser. No. 60/311, 346 filed on Aug. 13, 2001, the entire contents of said application being expressly incorporated herein by reference.

CROSS REFERENCES TO RELATED APPLICATIONS

Related subject matter is disclosed in provisional U.S. patent application Ser. No. 10/032,064 filed on Dec. 31, 2001 by Nelson Bonilla and Joseph V. DeBatolo; the entire contents of said application being expressly incorporated herein by reference.

FIELD OF THE INVENTION

The present invention generally relates to ground fault circuit interrupter (GFCI) devices. More particularly, the invention relates to a GFCI device having a latching mechanism that internally prevents reset of the device in the event of miswiring.

BACKGROUND OF THE INVENTION

GFCI devices are designed to trip in response to the detection of a ground fault condition at an AC load. Generally, the ground fault condition results when a person comes into contact with the line side of the AC load and an earth ground at the same time, thus creating a situation which can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, a mechanically latched circuit breaker within the GFCI device is immediately tripped to an open condition, thereby opening both sides of the AC line and removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of different current when a line-to-ground fault occurs.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical receptacle configuration is shown, for example, in U.S. Pat. No. 4,568,997, to Bienwald et al., the entire content of which is incorporated herein by reference. This type of receptacle includes test and reset pushbuttons and a lamp or light-emitting diode (LED) which indicates that the circuit is operating normally. When a ground fault occurs in the protected circuit, or when the test button is depressed, the GFCI device trips and an internal circuit breaker opens both sides of the AC line. The tripping of the circuit breaker causes the reset button to pop out and the LED to be extinguished, providing a visual indication that a ground fault has occurred. In order to reset the GFCI device, the reset button is depressed in order to close and latch the circuit breaker, and this also causes the LED to illuminate once again.

In addition to ground fault detection/protection, protection from miswiring is also needed. Specifically, GFCI receptacles of the type described above may be erroneously connected with the incoming AC source conductors being tied directly to the load or feedthrough terminals of the receptacle rather than to the source terminals. Because of the nature of the internal wiring of the GFCI receptacle, this miswiring condition is not easily detected. AC power will still be present at the receptacle outlets, making it appear that the receptacle is operating normally. If the test push button is depressed, the latching mechanism within the GFCI receptacle will be released and the reset push button will pop out, again making it appear that the GFCI receptacle is operating normally and providing the desired ground fault protection. In reality, however, no such protection is being provided because the AC source has been wired directly to the receptacle outlets without passing through the internal circuit breaker of the GFCI device.

Additionally, the safety function of GFCI devices depends upon power being prevented from reaching the receptacle when a trip condition occurs. A potentially unsafe condition occurs if the test button is pressed and the GFCI fails to trip. Therefore, the need exists for a GFCI device with a fail safe system to ensure that when the test button is pressed and the GFCI device fails to trip, the failed condition of the GFCI devices is indicated to the user in some manner.

Another concern with regard to miswiring relates to the receptacle terminals. Specifically, the conventional GFCI device has a set of load terminals that are shared with the receptacle terminals leading to the face of the receptacle. In the typical miswiring scenario, the AC source is connected to the load terminals while the downstream load devices are connected to the line terminals. Thus, while tripping the latching mechanism in response to a miswiring condition protects the downstream devices, devices plugged into the GFCI receptacle may still be subjected to AC power. It is therefore desirable to provide a latching mechanism that does not share the contacts between the receptacle terminals and the load terminals.

SUMMARY OF THE INVENTION

The above and other objectives are substantially achieved by a system and method employing a ground fault circuit interrupter (GFCI) in accordance with the principles of the present invention. The method and system include a sensing circuit having an electro-mechanical device, where the sensing circuit selectively places the electro-mechanical device in a ground fault state in response to an imbalance of current flow in an AC receptacle. A latching mechanism is connected to the sensing circuit, where the latching mechanism breaks a plurality of conductive paths between source and load terminals of the AC receptacle when the electro-mechanical device is placed in the ground fault state. The latching mechanism continues the imbalance of current flow when an AC source is improperly connected to the AC receptacle. By continuing the imbalance of current flow, a miswiring lock out is effected and enhanced safety is achieved.

In another aspect of the invention, a method and latching system include a first switch and a second switch. The first switch selectively breaks a first conductive path between a first source terminal and a first load terminal. The second switch selectively breaks a second conductive path between a second source terminal and a second load terminal. The second switch provides an alternative current path between the second load terminal and the first source terminal when the first conductive path has been restored by the first switch and an AC source is connected to the load terminals.

Further in accordance with the present invention, a system and method for preventing improper wiring of an AC source to an AC receptacle as provided. The method includes the step of selectively placing an electro-mechanical device in a ground fault state in response to an imbalance of current flow in the AC receptacle. A plurality of conductive paths between source and load terminals of the AC receptacle are broken when the electro-mechanical device is placed in the ground fault state. The method further provides for continuing the imbalance of current flow when the AC source is improperly connected to the AC receptacle.

DETAILED DESCRIPTION OF THE PREFERRED EMBODIMENTS

Figure 1:
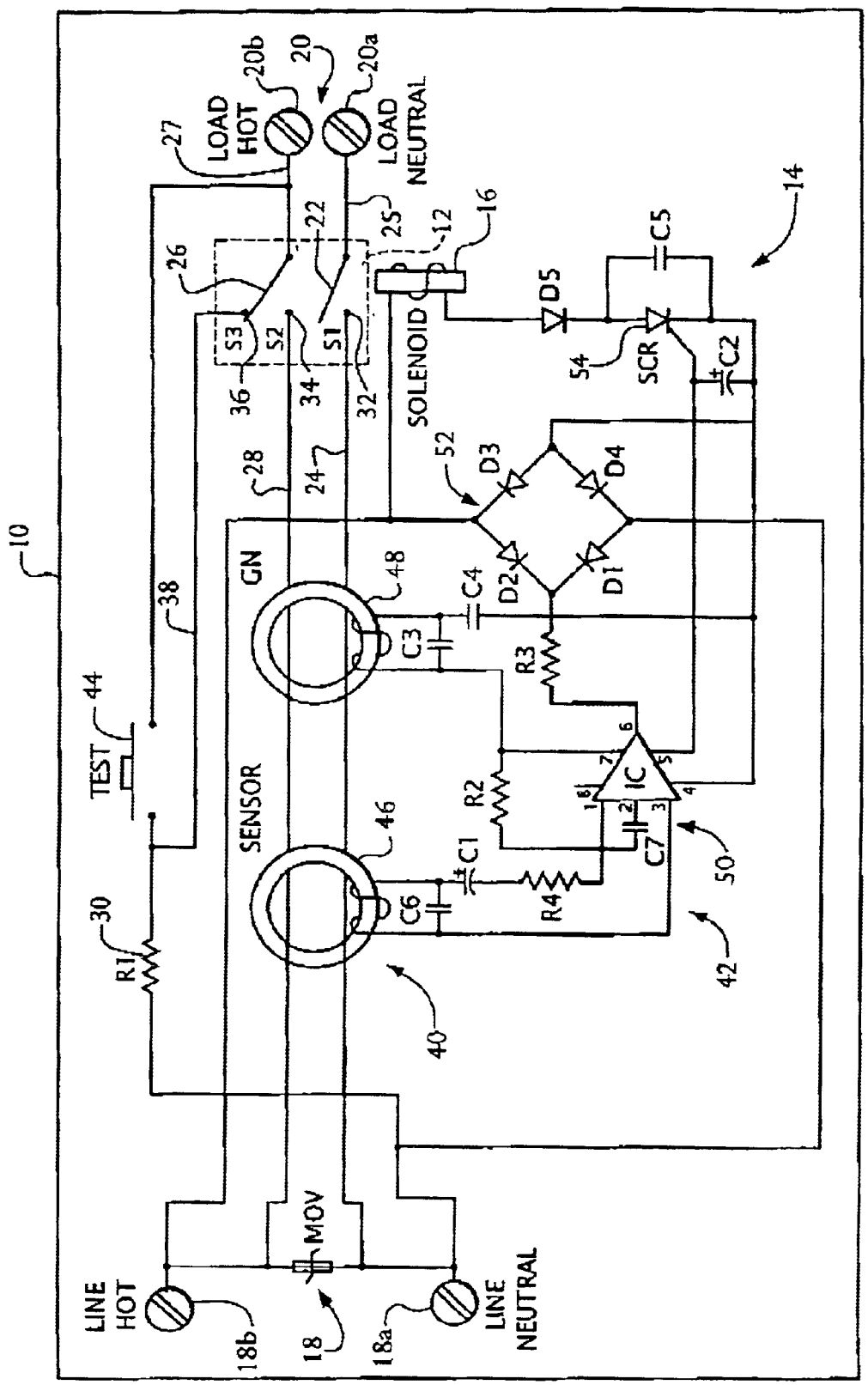
FIG. 1 is a circuit schematic of an example of a GFCI in accordance with an embodiment of the present invention.
Figure 2:
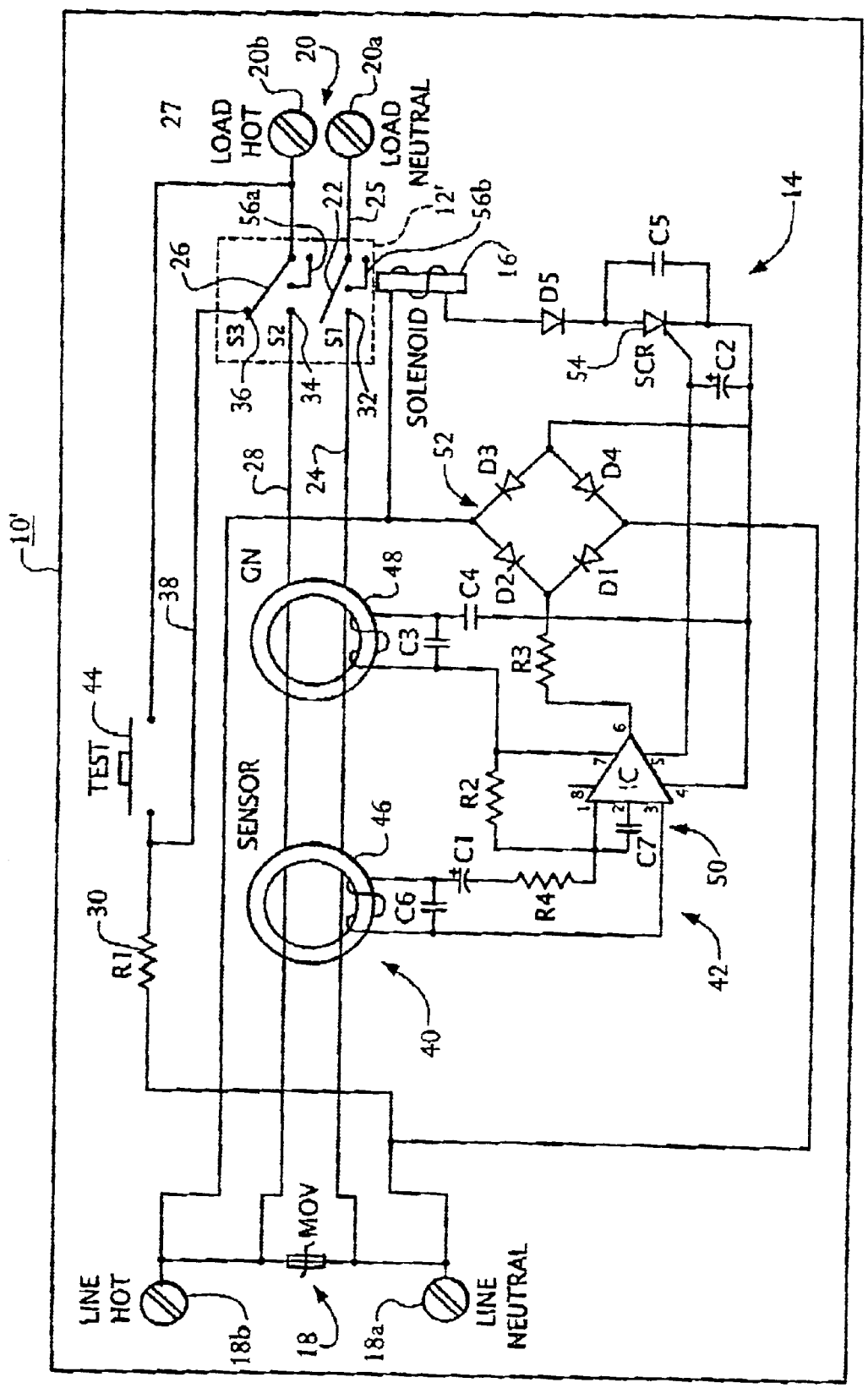
FIG. 2 is a circuit schematic of an example of a GFCI in accordance with a first alternative embodiment of the present invention.
Figure 3:
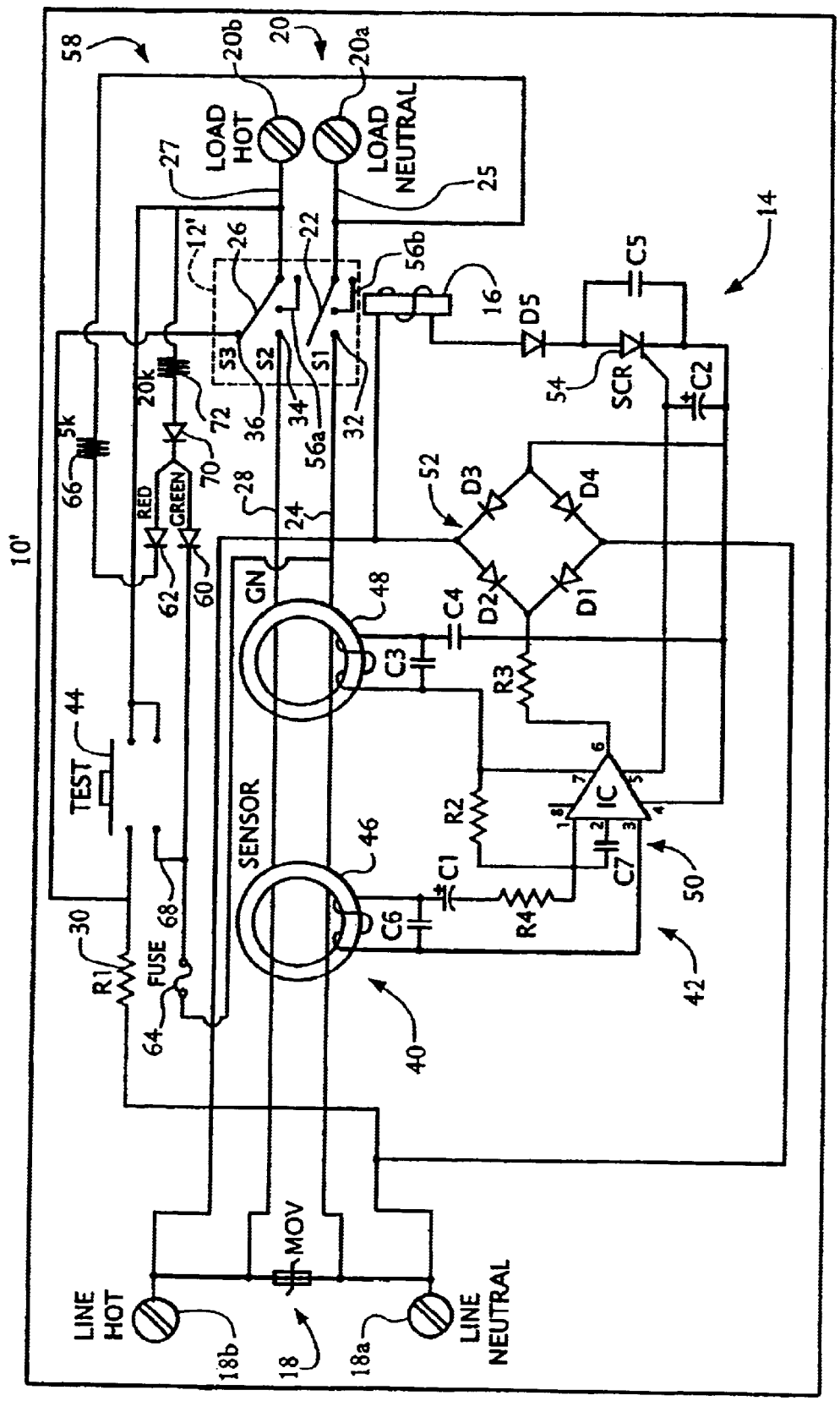
FIG. 3 is a circuit schematic of an example of a GFCI in accordance with a second alternative embodiment of the present invention.

In accordance with the present invention, a ground fault circuit interrupter (GFCI) device 10 is provided with a latching mechanism 12, which enables "lockout" of the GFCI 10 in the event that the GFCI 10 is miswired. FIGS. 1–3 illustrate, respectively, three embodiments of the present invention that each employ a lockout enabling latching mechanism. Generally, it can be seen in FIG. 1 that the GFCI 10 has a sensing circuit 14 and the latching mechanism 12. The sensing circuit 14 has an electro-mechanical device such as solenoid 16 and selectively places the solenoid 16 in a ground fault state in response to an imbalance of current flow in an AC receptacle. While the electro-mechanical device is shown here as being a solenoid, other devices such as piezoelectric components and micro electro-mechanical systems (MEMS) may be used. It can also be seen that the latching mechanism 12 is connected to the sensing circuit 14 and is placed in series with a plurality of conductive paths between source and load terminals of the receptacle. Specifically, the latching mechanism 12 breaks a plurality of conductive paths leading from source terminals 18 to load terminals 20 of the AC receptacle when the solenoid 16 is placed in the ground fault state. As will be discussed in greater detail below, the latching mechanism 12 has an internal structure that continues the imbalance of current flow when an AC source (not shown) is improperly connected to the AC receptacle. By continuing the imbalance of current flow, the latching mechanism 12 provides improved safety while maintaining a relatively low level of complexity with regard to conventional approaches.

It should also be noted that the sensing circuit 14 effectively defines an imbalance of current flow as any difference in the amount of current flowing in the candidate paths that rises above a predetermined threshold. Thus, the "imbalance" resulting from the miswiring lockout feature is the same as an imbalance resulting from manually testing the GFCI although the amount by which the predetermined threshold is exceeded may differ.

It can further be seen that the latching mechanism 12 preferably includes a first switch 22 which, when closed, connects the load neutral terminal 20a to first contact 32, and is capable of selectively breaking the first conductive path. A second switch 26, when closed, connects the load hot terminal 20b to second contact 34, and selectively breaks the second conductive path. To better demonstrate the operation of latching mechanism 12, the sensing circuit 14 will now be described in greater detail. Generally, it can be seen that the sensing circuit 14 has a transformer arrangement 40, a control circuit 42 and a primary test switch 44. The transformer arrangement 40 generates control signals in response to the imbalance of current flow, while the control circuit 42 is connected to the transformer arrangement 40 and selectively generates a switching signal based on the control signals. The primary test switch 44 is connected between the second load terminal 20b and the first source terminal 18a such that the primary test switch 44 enables manual generation of the imbalance of current flow.

Specifically, when the primary test switch 44 is closed (for example, manually, by an installer of the device), a circuit path is created from the second load terminal 20b to the first source terminal 18a, which creates an imbalance that is detected by a first (or sense) transformer 46. The first transformer 46 detects imbalances in the net flux on the load hot and load neutral lines of the device, and operates in conjunction with the control circuit 42 to energize the solenoid 16. Detection of the imbalance condition by the first transformer 46 and the control circuit 42 causes activation of the solenoid 16 such that the first and second switches 22, 26 to the load are open as shown in FIG. 1. It can be further be seen that a second (grounded neutral) transformer 48 is also provided to allow the transformer arrangement 40 to measure the change in net flux between the first conductive path and the second conductive path.

It can be seen that the control circuit 42 preferably includes an amplifier and trip circuit 50, a full-wave bridge rectifier 52 and a silicon controlled rectifier (SCR) 54. The amplifier and trip circuit 50 generates the switching signal, where the bridge rectifier 52 is connected to the first source terminal 18a and the second source terminal 18b. It can be seen that the bridge rectifier 52 provides power to the amplifier and trip circuit 50 and that the SCR 54 selectively energizes the solenoid 16 based on the switching signal. The control circuit 42 preferably includes the components listed in Table 1 below:

TABLE 1

EXEMPLARY COMPONENT LIST

| | |
|---|---|
| CAPACITOR C1 | 10 MIC OF AND, 16 VDC ALUM, ELECTROLYTIC |
| CAPACITOR C2 | 3.3 MIC, 16 VDC ALUM, ELECTROLYTIC |
| CAPACITOR C3 | .01 MIC, 50 VDC CERAMIC |
| CAPACITOR C4 | .033 MIC, 25 VDC CERAMIC |
| CAPACITOR C5 | .01 MIC, 500 VDC CERAMIC |
| CAPACITOR C6 | .01 MIC, 50 VDC CERAMIC |
| CAPACITOR C7 | 470 PIC, 50 VDC CERAMIC |
| DIODE D1 | IN4004 |
| DIODE D2 | IN4004 |
| DIODE D3 | IN4004 |
| DIODE D4 | IN4004 |
| DIODE D5 | IN4004 |
| RESISTOR R1 | 15K OHM, ¼ W CARBON FILM |
| RESISTOR R2 | 1.5 MED OHM, ¼ W METAL FILM |
| RESISTOR R3 | 24K OHM, ½ W CARBON FILM |
| RESISTOR R4 | 200 OHM, ¼ W CARBON FILM |
| IC | RV4145 |

The state of switches 22 and 26 shown in FIG. 1 indicates that the solenoid 16 has entered the ground fault state, due to depression of the test button 44 or due to an actual ground fault. However, when the solenoid 16 is not in the ground fault state and the latching mechanism has been properly reset so that first switch 22 is closed to first contact (S1) 32 and second switch 26 is closed to second contact (S2) 34, the first conductive path includes the first source terminal 18a, first source conductor 24, first switch 22, first load conductor 25 and first load terminal 20a. Similarly, the second conductive path includes second source terminal 18b, a second source conductor 28, second switch 26, second load conductor 27 and second load terminal 20b. While the first and second conductive paths are shown as corresponding to the neutral and hot connections respectively, it will be appreciated that these assignments can readily be reversed without parting from the spirit and scope of the invention.

It is also important to note that when in the ground fault (open) state, as shown in FIG. 1, the second switch 26 provides an alternative current path between the second load terminal 20b and the first source terminal 18a. Thus, if the AC source is connected to load terminals 20 (i.e. miswired to the receptacle), second switch 26 being closed to third contact (S3) 36 enables current to flow through current limiting resistor R1 30. It can further be seen that the latching mechanism 12 is structured such that, in response to a reset button (not shown) being pressed on the AC receptacle, switch 26 and third contact (S3) 36 continue to complete the alternative path through conductor 38 after switch 22 closes on first contact (S1) 32. Thus, when the AC source is improperly connected to the load terminals 20, this current path will create an imbalance in the transformer arrangement 40 which will prevent sensing circuit 14 from being reset. That is, switch 26 remains in an open state.

Turning now to FIG. 2, an alternative latching circuit 12' is provided in which additional protection is provided. Specifically, it will be appreciated that if the receptacle face terminals are shared with the load terminals 20, the receptacle face terminals may receive power in the event that the AC source is connected to the load terminals 20. In fact, it is quite common for the receptacle face terminals to be tied directly to the load terminals without any isolation mechanism. If protection from such a condition is desired, the latching mechanism 12' can be equipped with a dedicated set of receptacle contacts 56a, 56b, where the receptacle contacts 56a, 56b are electrically isolated from the load terminals 20 when switches 22, 26 are open. Thus, power is removed from the receptacle contacts 56a, 56b when there is an imbalance in current flow and/or when the GFCI 10 is locked-out due to miswiring. On the other hand, when the switches 22, 26 are allowed to close during reset if the receptacle is wired properly, the unique alignment of the receptacle contacts 56a, 56b enables the receptacle face to receive power from the source conductors 28 and 24, respectively.

Turning now to FIG. 3, an alternative GFCI 10" is provided with a notification system 58 for enabling diagnosis of the GFCI 10". As will be discussed in greater detail below, the notification system 58 provides the installer/user of the receptacle with valuable information regarding both ground fault sensing and miswiring. Thus, the installer/user of the receptacle is able to determine whether the GFCI 10" is correctly sensing ground faults and whether the AC source has been properly wired to the receptacle.

It can generally be seen that the notification system 58 includes a first indicator such as a green LED 60 and a second indicator such as red LED 62. It should be noted that while the illustrated embodiment uses LEDs to provide visual notification, audible notification can also be achieved with the use of buzzers, or the like. As indicated, the green LED 60 is connected between the second load terminal 20b and the first source terminal 18a, while the red LED 62 is connected between the second load terminal 20b and the first load terminal 20a. It can further be seen that a fusing mechanism such as fuse 64 is connected in series with the green LED 60. Similarly, a current limiting resistor 66 is connected in series with the red LED 62. A secondary test switch 68 selectively short-circuits the green LED 60 based on operation of the primary test switch 44, where the primary test switch 44 enables manual generation of the imbalance of current flow. The secondary test switch 68 completes the short-circuit after the primary test switch 44 completes the imbalance of the current flow such that the short-circuit blows the fuse 64 when the primary test switch 44 fails to place the solenoid 16 in the ground fault state. Thus, when the primary test switch 44 is closed, the green LED 60 is extinguished if the GFCI 10" is not detecting ground faults correctly. The various potential indication scenarios will now be discussed in detail.

It will be appreciated that when the GFCI 10" is initially installed, it is intended that the AC source (not shown) be connected to the source terminals 18. Under these conditions, the switches 22, 26 are in the closed position with the green LED 60 and the red LED 62 effectively being connected in parallel between diode 70 and the first conductive path. It can further be seen that the green LED 60 is shorted through fuse 64, whereas the red LED 62 is connected in series with the resistor 66. Thus, the current flowing through resistor 72 and diode 70 will take the path of the least resistance through the fuse 64 to enable the green LED 60 to illuminate. There is no danger of blowing the fuse 64 because the 20k resistor 72 limits the current flowing between the conductive paths. When the primary test switch 44 is depressed and the GFCI 10" is operating properly, the resulting imbalance of current flow will cause the latching mechanism 12 to move into the position shown in FIG. 3. Since both current paths are broken and the AC source is connected to the source terminals 18, no current is available to flow through either of the LEDs 60, 62. Both of the LED's are therefore extinguished. Furthermore, the closing of secondary test switch 68 has no effect because the conductive paths have already been broken. When the GFCI 10" is reset (by depressing an appropriately designed reset button, for example), the green LED 60 re-illuminates and the red LED 62 remains extinguished because the current flow through the green LED 60 and the fuse 64 has been restored.

When the AC source is connected to the load terminals 20, on the other hand, a different notification sequence takes place. For example, when the GFCI 10" is operating properly, depressing the primary test switch 44 causes the latching mechanism 12 to open the conductive paths but the red LED 62 will illuminate. This is because the red LED 62 is connected on the load side of the latching mechanism 12. Thus, current is still able to flow through resistor 72, diode 70, red LED 62 and resistor 66. Furthermore, the latching mechanism 12 will not reset due to the lock-out feature discussed above. Thus, when the GFCI 10" is operating properly and wired incorrectly, the green LED 60 will extinguish, the red LED 62 will remain illuminated and the latching mechanism 12 will be locked-out.

When the GFCI 10" is wired correctly and operating improperly, yet another sequence of events takes place. In this case, when the GFCI 10" is tested the imbalance of current flow resulting from the primary test switch 44 fails to trip the latching mechanism 12. The secondary test switch 68 shorts the two current paths directly together through fuse 64. This short blows the fuse 64 and permanently extinguishes the green LED 60. When the GFCI 10" is reset, the red LED 62 illuminates because the current path through the fuse 64 is no longer available. It is important to note, however, that the latching mechanism 12' will not be locked-out because the AC source is connected to the source terminals 18.

It will further be appreciated that it is possible for the GFCI 10" to be both reverse wired and operating improperly. In this case, when the GFCI 10" is tested the green LED 60 will extinguish due to the short circuit of fuse 64. Furthermore, the red LED 62 will illuminate due to the reverse wiring condition. It will further be appreciated that the above-described lock-out of latching mechanism 12 will be in effect such that the reset feature is disabled and the red LED 62 remains illuminated.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A fault circuit interrupter for use with an alternating current (AC) receptacle comprising first and second source terminals, and first and second load terminals, the fault circuit interrupter comprising:
    a sensing circuit, adapted to selectively enter a fault detection state in response to an imbalance of current flow in the AC receptacle;
    a latching mechanism, adapted to break at least one conductive path between said source and load terminals of the AC receptacle in response to entry of said sensing circuit in said fault state;
    said sensing circuit being further adapted to maintain said latching mechanism in a condition to maintain a break in at least one of said conductive paths when an AC source is connected to said load terminals instead of to said source terminals;
    a first switch, adapted to selectively break a first one of said conductive paths; and
    a second switch, adapted to selectively break a second one of said conductive paths;
    said second switch, being further adapted to provide an alternative current path between said second load terminal and said first source terminal when the first conductive path has been restored via the first switch;
    said first switch includes a first contact, adapted to establish the first conductive path; and
    said second switch includes a second contact, adapted to establish the second conductive path, and a third contact, adapted to establish the alternative current path; and
    said latching mechanism being structured such that, in response to a reset button being actuated, the second switch and the third contact establish the alternative current path while the first switch and the first contact establish the first conductive path and before the second switch and the second contact establish the second conductive path.

2. The fault circuit interrupter of claim 1 wherein the latching mechanism further includes a dedicated set of receptacle contacts, adapted to couple to said source terminals when said first and second switches are positioned to establish said first and second conductive paths.

3. The fault circuit interrupter of claim 1 further including a notification system, coupled between the latching mechanism and the sensing circuit, and being adapted to provide indication of at least one of the following:
    said break in said at least one of said conductive paths; and
    connection of said AC source to said load terminals.

4. The ground fault circuit interrupter of claim 3 wherein the notification system includes:
    a first indicator, coupled between a second load terminal of the latching mechanism and a first source terminal of the latching mechanism, and being adapted to indicate said break in said at least one of said conductive paths; and
    a second indicator, coupled between the first and second load terminals of the latching mechanism, and being adapted to indicate connection of said AC source to said load terminals.

5. The ground fault circuit interrupter of claim 4 further including:
    a fuse, coupled to the first indicator; and
    a secondary test switch, adapted to selectively short-circuit the first indicator in response to operation of a primary test switch which creates generation of the imbalance of current flow;
    said secondary test switch establishing the short-circuit after the primary test switch establishes the imbalance of current flow such that the short-circuit blows the fuse when the primary test switch fails to place the sensing circuit in the fault state.

6. The ground fault circuit interrupter of claim 4 wherein the indicators comprise light emitting diodes (LEDs).

7. The ground fault interrupter of claim 1 wherein the sensing circuit further includes:
    a transformer arrangement, adapted to generate control signals in response to said imbalance of current flow;
    a control circuit, coupled to the transformer arrangement, and adapted to selectively generate a switching signal in response to the control signals; and
    a primary test switch, coupled between a second load terminal of the latching mechanism and a first source terminal of the latching mechanism, and being adapted to enable manual generation of the imbalance of current flow.

8. The ground fault circuit interrupter of claim 7 wherein the transformer arrangement includes:
    a first transformer, adapted to detect an imbalance in flux between the conductive paths; and
    a second transformer, adapted to detect a connection between the second conductive path and an earth ground.

9. The ground fault circuit interrupter of claim 7 wherein the control circuit includes:
    an amplifier and trip circuit, adapted to generate the switching signal;
    a full-wave bridge rectifier, coupled to the first source terminal and the second source terminal of the latching mechanism, and adapted to provide power to the amplifier and trip circuit; and
    a silicon controlled rectifier, adapted to selectively energize the sensing circuit in response to the switching signal.

10. A latching mechanism for a fault circuit interrupter, the latching mechanism comprising:
   a first switch, adapted to selectively break a first conductive path between a first source terminal and a first load terminal; and
   a second switch, adapted to selectively break a second conductive path between a second source terminal and a second load terminal and being further adapted to provide an alternative current path between the second load terminal and the first source terminal when the first conductive path has been restored via the first switch;
   said first switch includes a first contact, adapted to establish the first conductive path;
   said second switch includes a second contact, adapted to establish the second conductive path, and a third contact, adapted to establish the alternative current path; and
   said switching mechanism being structured such that, in response to a reset button being actuated, the second switch and the third contact establish the alternative current path while the first switch and the first contact establish the first conductive path and before the second switch and the second contact establish the second conductive path.

11. The latching mechanism of claim 10 further including a dedicated set of receptacle terminals.

12. A fault circuit interrupter comprising:
   a transformer arrangement, adapted to generate control signals in response to an imbalance of current flow in an AC receptacle;
   a control circuit, coupled to the transformer arrangement, and being adapted to selectively generate a switching signal based on the control signals;
   a primary test switch, coupled between a second load terminal and a first source terminal, and being adapted to enable manual generation of the imbalance of current flow;
   a first latch switch, adapted to selectively break a first conductive path between the first source terminal and a first load terminal; and
   a second latch switch, adapted to selectively break a second conductive path between a second source terminal and the second load terminal and being adapted to provide an alternative current path between the second load terminal and the first source terminal when the first conductive path has been restored via the first latch switch;
   said first latch switch includes a first contact, adapted to establish the first conductive path;
   said second switch includes a second contact, adapted to establish the second conductive path, and a third contact, adapted to establish the alternative current path; and
   said switching mechanism being structured such that, in response to a reset button being actuated, the second switch and the third contact establish the alternative current path while the first switch and the first contact establish the first conductive path and before the second switch and the second switch establish the second conductive path.

13. A method for preventing improper wiring of an AC source to an AC receptacle, the method comprising the steps of:
   selectively placing an electro-mechanical device in fault circuit interrupter in a ground fault state in response to an imbalance of current flow in the fault circuit interrupter;
   breaking a plurality of AC connections between source and load terminals of the AC receptacle when the electro-mechanical device is placed in the ground fault state;
   continuing the imbalance of current flow when the AC source is improperly connected to the load terminals of the AC receptacle;
   actuating a first switch to selectively break a first conductive path between one of the source terminals and one of the load terminals;
   actuating a second switch to selectively break a second conductive path between one of the other source terminals and another one of the load terminals; and
   causing the second switch to provide an alternative current path between one of the load terminals and one of the source terminals when the first conductive path has been restored via the first switch;
   establishing the first conductive path with a first contact of the first switch in response to a reset button being actuated; and
   establishing the alternative current path with a third contact of the second switch after the first contact establishes the first conductive path.

14. The method of claim 13 further including the step of enabling visual diagnosis of the improper connection with a first visual indicator and a second visual indicator.

15. A fault circuit interrupter for use with an alternating current (AC) receptacle comprising first and second source terminals, and first and second load terminals, the fault circuit interrupter comprising:
   a sensing circuit, adapted to selectively enter a fault detection state in response to an imbalance of current flow in the AC receptacle;
   a latching mechanism, adapted to break at least one conductive path between said source and load terminals of the AC receptacle in response to entry of said sensing circuit in said fault state;
   said sensing circuit being further adapted to maintain said latching mechanism in a condition to maintain a break in at least one of said conductive paths when an AC source is connected to said load terminals instead of to said source terminals; and
   a notification system, coupled between the latching mechanism and the sensing circuit, and being adapted to provide indication of at least one of said break in said at least one of said conductive paths and connection of said AC source to said load terminals;
   said notification system includes a first indicator, coupled between a second load terminal of the latching mechanism and a first source terminal of the latching mechanism, and being adapted to indicate said break in said at least one of said conductive paths; and a second indicator, coupled between the first and second load terminals of the latching mechanism, and being adapted to indicate connection of said AC source to said load terminals.

16. The ground fault circuit interrupter of claim 15 further including:
   a fuse, coupled to the first indicator; and
   a secondary test switch, adapted to selectively short-circuit the first indicator in response to operation of a primary test switch which creates generation of the imbalance of current flow;
   said secondary test switch establishing the short-circuit after the primary test switch establishes the imbalance of current flow such that the short-circuit blows the fuse when the primary test switch fails to place the sensing circuit in the fault state.

17. The ground fault circuit interrupter of claim 15 wherein the indicators comprise light emitting diodes (LEDs).

18. A method for preventing improper wiring of an AC source to an AC receptacle, the method comprising the steps of:

selectively placing an electro-mechanical device in fault circuit interrupter in a ground fault state in response to an imbalance of current flow in the fault circuit interrupter;

breaking a plurality of AC connections between source and load terminals of the AC receptacle when the electro-mechanical device is placed in the ground fault state;

continuing the imbalance of current flow when the AC source is improperly connected to the load terminals of the AC receptacle;

enabling visual diagnosis of the improper connection with a first visual indicator and a second visual indicator.

* * * * *